United States Patent [19]

Suzuki

[11] Patent Number: 4,548,571

[45] Date of Patent: Oct. 22, 1985

[54] FOOD SHAPING APPARATUS

[76] Inventor: Kisaku Suzuki, 1-19-8, Toshida, Nerima-ku, Tokyo, Japan

[21] Appl. No.: 627,386

[22] Filed: Jul. 3, 1984

Related U.S. Application Data

[62] Division of Ser. No. 408,974, Aug. 17, 1982, Pat. No. 4,460,611.

[30] Foreign Application Priority Data

| | | |
|---|---|---|
| Aug. 20, 1981 [JP] | Japan | 56-123394 |
| Oct. 30, 1981 [JP] | Japan | 56-163285 |
| Nov. 26, 1981 [JP] | Japan | 56-190261 |
| Dec. 25, 1981 [JP] | Japan | 56-197719 |

[51] Int. Cl.⁴ .......................... A23P 1/00; A22C 7/00
[52] U.S. Cl. .................. 425/297; 99/450.1; 99/485; 425/308; 425/315; 425/371
[58] Field of Search ................. 99/352, 353, 355, 356, 99/426, 428, 450.1, 450.2, 450.7, 483; 426/512, 426/513, 272, 627, 516, 518, 643, 646; 425/327, 225, 425/297, 308, 371, 204, 403, 315, 403.1; 17/32, 45

[56] References Cited

U.S. PATENT DOCUMENTS

| | | | |
|---|---|---|---|
| 2,867,000 | 1/1959 | Huszar | 425/297 |
| 2,969,025 | 1/1961 | Schafer | 99/450.1 |
| 4,334,464 | 6/1982 | Shinriki | 99/450.2 |

FOREIGN PATENT DOCUMENTS 45-21620  7/1970  Japan ...................... 99/450.6

*Primary Examiner*—Timothy F. Simone
*Attorney, Agent, or Firm*—Jordan and Hamburg

[57] ABSTRACT

A pair of endless belts define a downwardly extending path therebetween which progressively reduces in width from the top to the bottom, so that a material of a foodstuff is compressed while being fed downwardly by the belts through the path. A horizontal conveyor belt lies below the path and is indexed to transfer a predetermined cut length of the material to a shaping station where the material is pushed up into a shaped cavity of a flexible cup member. The flexible cup member is embraced by presser members to shape the material under a preselected adjustable pressure. The resulting block of material attains hardness and shape which would be provided by hand-shaping. Regardless of the hardness of the material in the downward path between the belts, the material can always be cut by each predetermined amount by adjusting the width of the path and, therefore, the degree of compression of the material.

16 Claims, 15 Drawing Figures

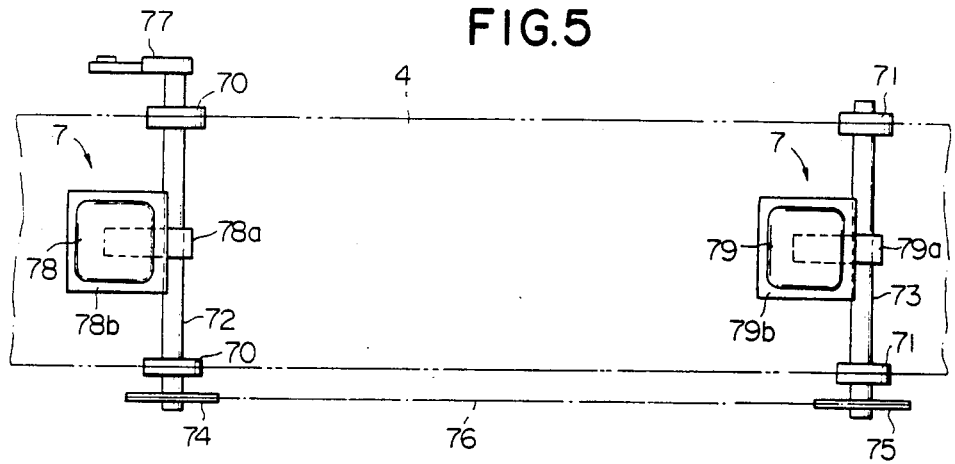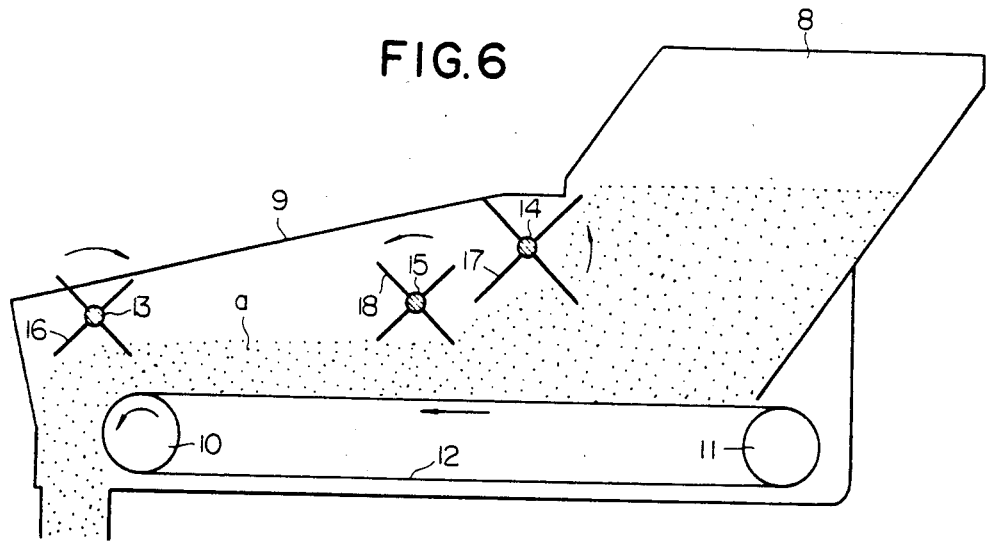

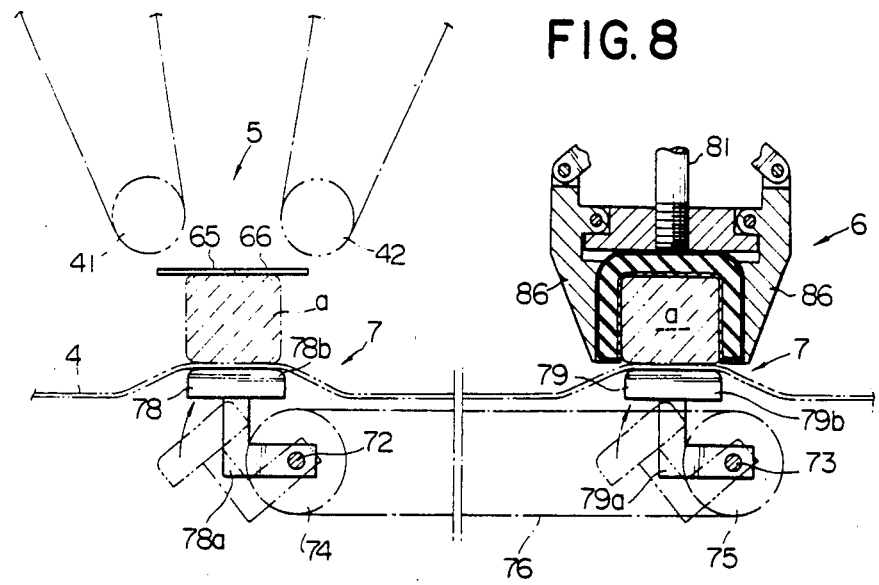
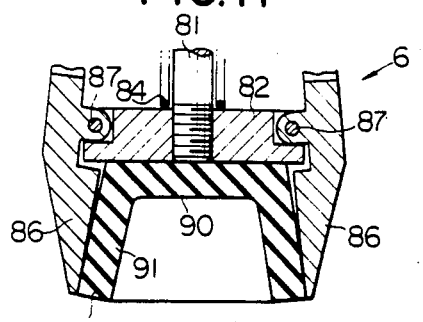
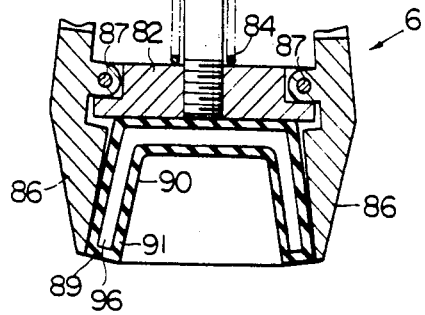
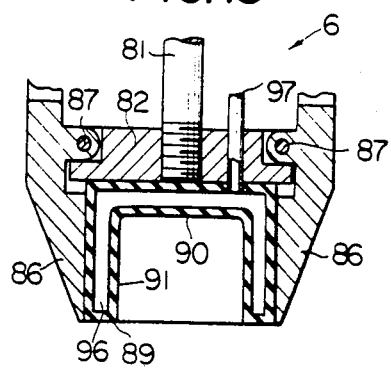

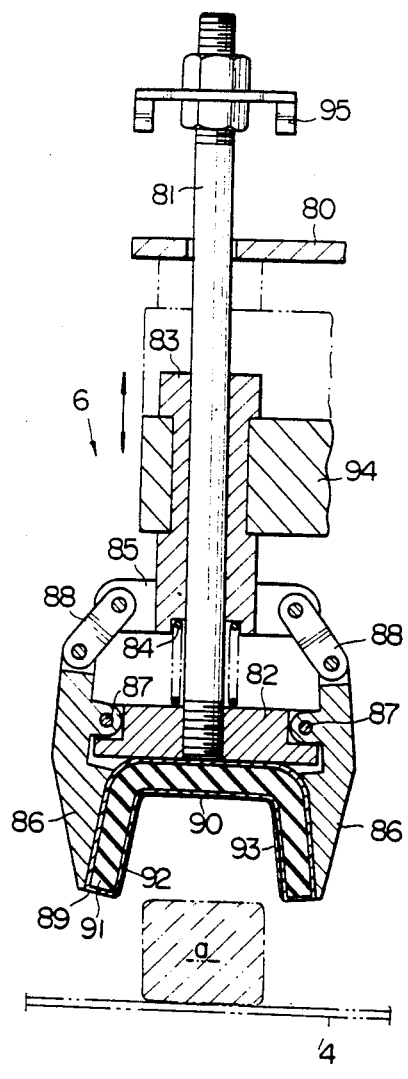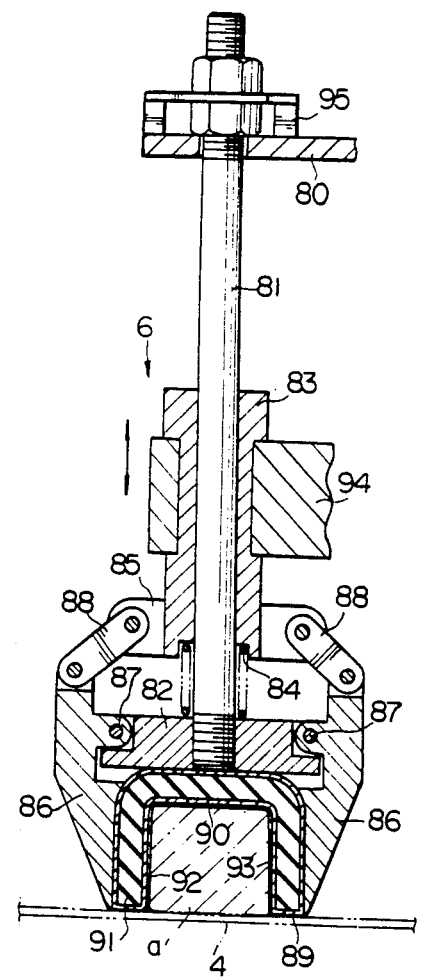

FOOD SHAPING APPARATUS

CROSS REFERENCE TO RELATED APPLICATION

This application is a division of copending U.S. patent application Ser. No. 408,974, filed Aug. 17, 1982, now U.S. Pat. No. 4,460,611 issued July 17, 1984.

BACKGROUND OF THE INVENTION

The present invention relates to a method of shaping a material of a food into a specific shape and to a hardness and taste which would be achievable with hand-shaping or hand-rolling. The present invention is also related with an apparatus for practicing such a method.

Various foodstuffs are known which are prepared by hand-shaping predetermined amounts of rice, meat or like material into desired shapes. Typical examples of this kind of foodstuffs may be sushi, hamburger steak and croquette. Such a type of process relying on manual work is not suitable for mass production due to the need for many workers and the poor yield. Nevertheless, there is an increasing demand for such processed foods in parallel with the recent worldwide change of diet. This demand cannot readily be met, however, due to the ever increasing labor cost.

Sushi, for example, has come to win polularity particularly in the dietary aspect. Sushi is a hand-rolled block of rice which should be constant both in amount and in shape. Hand-rolling, however, cannot avoid irregularity in shape or size or prepare a large number of blocks at a time. Only the qualified persons with a long time of experience and skillful with their fingers can roll rice to a constant size at a commercially acceptable rate. Such persons are rare today and, if employed, would make the business ill-paid due to the prohibitive wages. Thus, mechanical means would prove quite convenient if realized to shape rice into blocks of sushi as hard and tasty as skillful hand-rolling. However, hardly any propositions have heretofore been made on such a type of food shaping apparatuses. A food shaping method is known which employs a mold of wood formed with recesses to the shape of sushi and prepares sushi by filling the recesses with rice and compressing it strongly from above. Yet, the resulting sushi is usually too hard and cannot attain the taste which is peculiar to hand-rolling. Should the rice be compressed with a smaller force to adjust the hardness, it would fall off the shaped block into mere grains.

SUMMARY OF THE INVENTION

In an aspect of the present invention, there is provided a food shaping apparatus which comprises a flexible cup member formed of rubber, sponge or like suitable elastic material and provided with a cavity which is open at one end thereof for receiving a foodstuff therein. Presser members are located outside the flexible cup to press the cup from therearound.

In accordance with the present invention, a pair of endless belts define a downwardly extending path therebetween which progressively reduces in width from the top to the bottom, so that a material of a foodstuff is compressed while being fed downwardly by the belts through the path. A horizontal conveyor belt lies below the path and is indexed to transfer a predetermined cut length of the material to a shaping station where the material is pushed up into a shaped cavity of a flexible cup member. The flexile cup member is embraced by presser members to shape the material under a preselected adjustable pressure. The resulting block of material attains hardness and shape which would be provided by hand-shaping. Regardless of the hardness of the material in the downward path between the belts, the material can always be cut by each predetermined amount by adjusting the width of the path and, therefore, the degree of compression of the material.

It is an object of the present invention to provide a food shaping apparatus which can shape various foodstuffs as hard and tasty as those shaped by hand-shaping.

It is another object of the present invention to provide a food shaping apparatus which can shape a food constantly to predetermined dimensions and hardness and is clean and suitable for mass-production.

It is another object of the present invention to provide a food shaping apparatus which once loosens a material of a food and then progressively compresses it to promote ready shaping to a desired shape at the following shaping station, while being capable of transferring the material by each predetermined amount to the shaping station despite a change in the hardness of the material.

It is another object of the present invention to provide a food shaping apparatus which prevents a block of material of a food from being broken or tilted on a conveyor belt.

It is another object of the present invention to provide a generally improved method of and apparatus for shaping a foodstuff.

Other objects, together with the foregoing, are attained in the embodiments described in the following description and illustrated in the accompanying drawings.

BRIEF DESCRIPTION OF THE DRAWINGS

FIG. 5 is a schematic plan view of a conveyor belt push-up mechanism;

FIGS. 6, 7a, 7b and 7c are views illustrating the operation of the material feeding mechanism;

FIG. 8 is a view illustrating the operation of the push-up mechanism;

FIGS. 9 and 10 are vertical sections of a shaping mechanism; and

FIGS. 11-13 are fragmentary sections showing other embodiments of the present invention.

DESCRIPTION OF THE PREFERRED EMBODIMENTS

While the method of and apparatus for shaping a food embodying the present invention is susceptible of numerous physical embodiments, depending upon the environment and requirements of use, substantial numbers of the herein shown and described embodiments have been made, tested and used, and all have performed in an eminently satisfactory manner.

Figure 1:
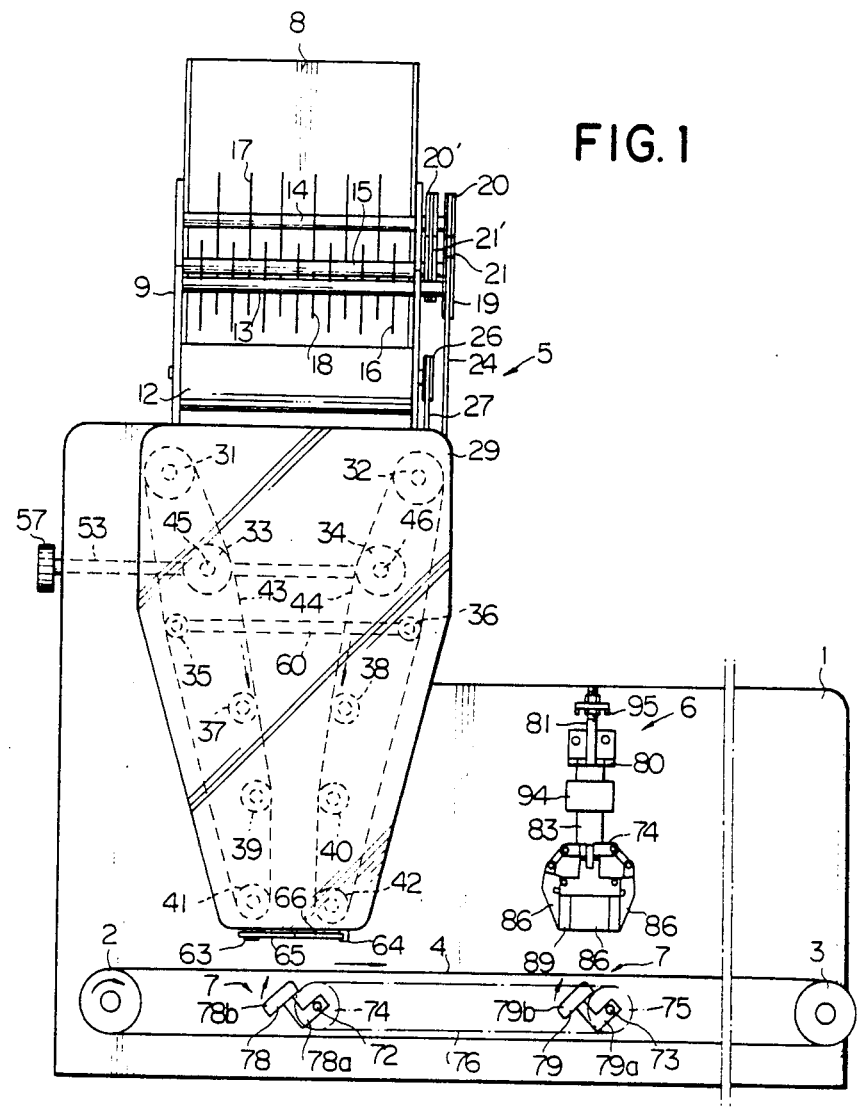
FIG. 1 is a schematic front view of a food shaping apparatus embodying the present invention.
Figure 2:
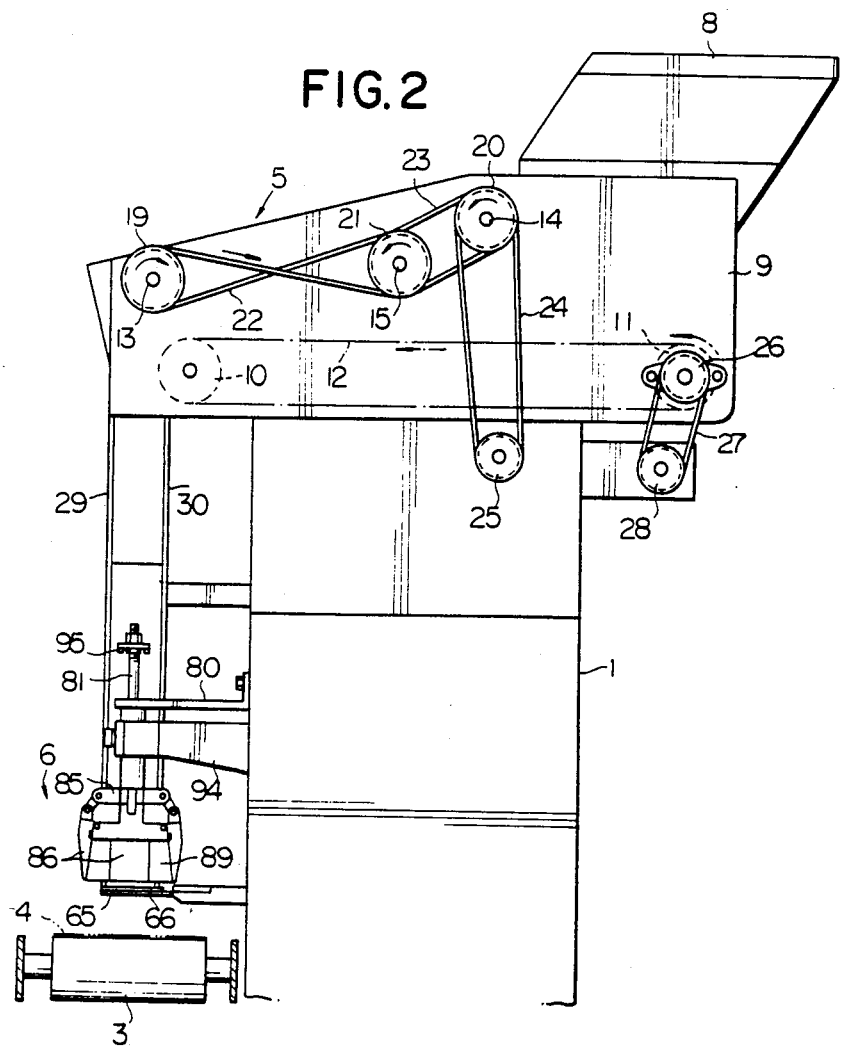
FIG. 2 is a side elevation of the apparatus shown in FIG. 1.
Figure 3:
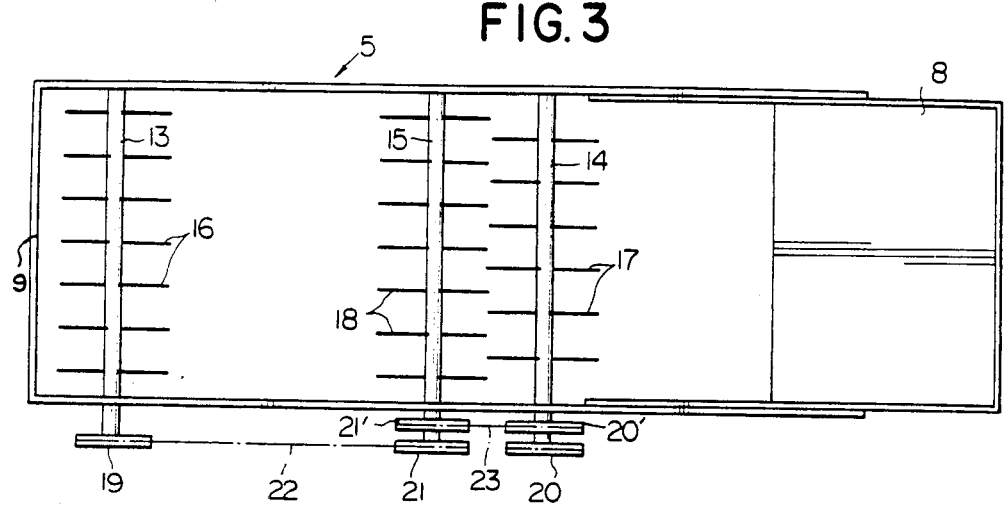
FIG. 3 is a schematic plan view of a part of a material feeding mechanism included in the apparatus shown in FIG. 1.

Referring to FIGS. 1 and 2 of the drawings, the apparatus comprises a body having a flat and vertical front end. Rollers 2 and 3 are journalled to laterally opposite lower portions of the front end of the body 1. An endless conveyor belt 4 runs horizontally between the opposite rollers 2 and 3. Disposed above and at a spacing along the conveyor belt 4 are a material feeding mechanism and a shaping mechanism which are generally designated by the reference numerals 5 and 6, respectively. Spaced mechanisms 7 are located between the upper and lower runs of the belt 4 in order to push the belt 4 upwardly for the purpose which will be described.

The feed mechanism 5 includes a hopper 8 positioned at the upper rear end thereof. A casing 9 which is open at its top extends longitudinally of the apparatus and is connected with the bottom of the hopper 8. Rollers 10 and 11 are journalled to the casing 9 at longitudinally spaced locations while a conveyor belt 12 is horizontally passed over the rollers 10 and 11. Three shafts 13, 14 and 15 extend between opposite side walls of the casing 9 across the conveyor belt 12. The shaft 13 is located adjacent to the front end of the belt 12, the shaft 14 before the bottom of the hopper 8 and the shaft 15 between the shafts 13 and 14. A plurality of scraper bars 16 are mounted on the shaft 13 at a predetermined spacing and alternate with each other along the shaft 13 at an angular spacing of 90°. Likewise, a plurality of loosener bars 17 are mounted on the shaft 14, and a plurality of smoother bars 18 on the shaft 15. It should be remembered, however, that the smoother bars 18 may be omitted for certain applications of the present invention. Outside the casing 9, the shafts 13, 14 and 15 carry at their corresponding ends rope wheels 19, 20, 20', 21 and 21'. A rope 22 runs between the wheels 19 and 21 such that each of the wheels 19 and 21 is rotatable as indicated by an arrow. A rope 23 runs between the wheels 20' and 21' to cause them into rotations as indicated by arrows. A rope 24 connects the wheel 20 to a rope wheel 25 which is in driven connection with a motor (not shown).

The roller 11 also carries at its end a rope wheel 26 which is connected by a rope 27 to a rope wheel 28, which is connected with a motor (not shown).

A pair of longitudinally spaced parallel plates 29 and 30 are connected with the bottom of the casing 9 ahead of the roller 10. Each of the side plates 29 and 30 has a generally inverted trapezoidal shape which is shorter at the bottom than at the top. Between the plates 29 and 30, there are arranged sequentially from top to bottom a pair of drive rollers 31 and 32, a pair of adjust rollers 33 and 34, a pair of tension rollers 35 and 36, and pairs of guide rollers 37, 38, 39, 40, 41 and 42. The drive rollers 31 and 32 are positioned in an upper part of the plates 29 and 30 spaced a substantial distance laterally. The interaxis distance progressively decreases from the adjust roller pair 33, 34 toward the guide roller pairs 37, 38 and 39, 40. The interaxis distance between the guide rollers 41 and 42 is approximately equal to that between the guide rollers 39 and 40. The tension rollers 35 and 36 are located slightly below the drive rollers 31 and 32. An endless belt 43 extends over the rollers 31, 33, 37, 39, 41 and 35 while an endless belt 44 extends over the other rollers 32, 34, 38, 40, 42 and 36. These belts 43 and 44 are positioned in symmetrical relation to define a vertical path which is open at its top.

Figure 4:
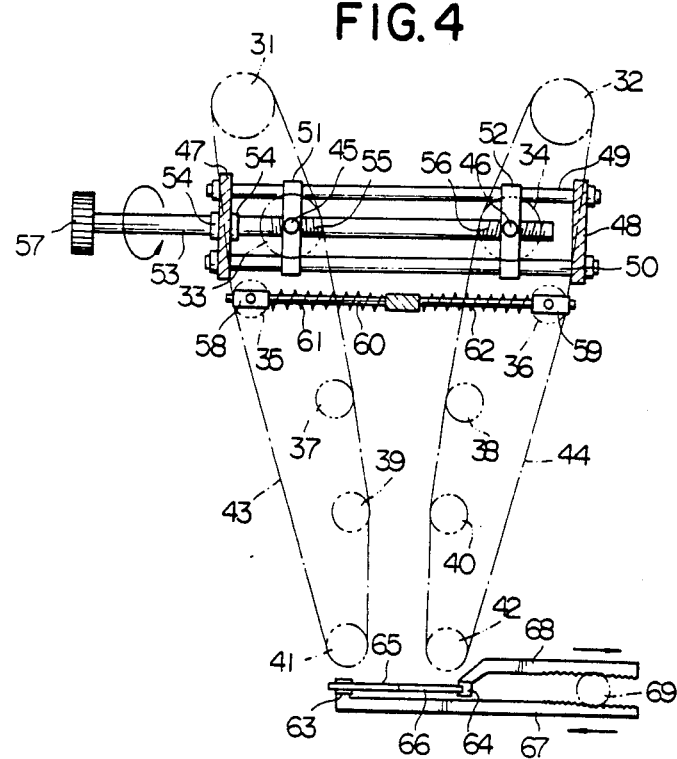
FIG. 4 is a schematic front view of another part of the material feeding mechanism.

As shown in FIG. 4, the adjust rollers 33 and 34 are mounted on the front ends of shafts 45 and 46, respectively, each of which extends rearwardly throughout the plate 30. The other ends of the shafts 45 and 46 are connected with sliders 51 and 52, respectively. The sliders 51 and 52 are movable in laterally opposite directions guided by parallel guide shafts 49 and 50 which extend one above the other between a pair of frame members 47 and 48, which are mounted to the body 1 of the apparatus. An adjusting rod 53 extends throughout the frame member 47 in between and parallel to the upper and lower guide shafts 49 and 50. Stops 54 are positioned at opposite sides of the frame member 47 so that the adjusting rod 53 is rotatable without any movement in the axial direction. The adjusting rod 53 is formed with spaced and opposite screwthreaded portions 55 and 56 to the right of the frame 47. The sliders 51 and 52 are engaged with the threaded portions 55 and 56, respectively. A knob 57 is carried on the left end of the adjusting rod 53 which projects from the body 1 of the apparatus.

The tension rollers 35 and 36 are rigidly mounted on sliders 58 and 59, respectively. Disposed to the rear of the plate 30, the sliders 58 and 59 are coupled over opposite ends of a guide shaft 60 which is mounted at its intermediate portion to the body 1 in parallel with the adjusting rod 53. The slider 58 is constantly biased outwardly by a coil spring 61 wound round the guide shaft 60, and so is done the other slider 59 by a coil spring 62.

Actuator arms 63 and 64 protrude horizontally from the body 1 adjacent to the lower ends of the side plates 29 and 30. The arm 63 carries a shutter 65 at its free end below the guide roller 41. Likewise, the arm 64 carries a coactive shutter 66 at its free end below the guide roller 42. Racks 67 and 68 extend horizontally within the body 1 and mesh with a pinion 69 from opposite sides.

Referring to FIGS. 1 and 5, the belt raising mechanisms 7 include a pair of bearings 70 and a second pair of bearings 71 located below the feeder mechanism 5 and shaper mechanism 6. The bearings of each pair face each other at opposite sides of the belt 4. A reversible shaft 72 is supported by the bearings 70 and a reversible shaft 73 by the bearings 71, each in parallel relation with the rollers 2 and 3. Sprocket wheels 74 and 75 are mounted on the corresponding ends of the shafts 72 and 73 and connected by a chain 76. A rocket arm 77 is rigidly mounted to the other end of the shaft 72 adjacent to the body 1 and operatively connected with a drive source (not shown). Belt pushers 78 and 79 are mounted on the shafts 72 and 73, respectively, each in a substantially intermediate portion of the belt 4. The belt pusher 78 comprises a generally L-shaped arm 78a rigidly connected with the shaft 72 at its one end and a shoe 78b having a flat top and formed on the other end of the L-shaped arm 78a. The other belt pusher 79 is constructed in the same way as the belt pusher 78 but has its structural parts designated by 79a and 79b in the drawings. The belt pushers 78 and 79 are thus movable in unison between an inoperative position where the shoes 78b and 79b remain slightly spaced downwardly from the belt 4 and an operative position where they push the belt 4 upwardly in pressing contact with the underside of the upper run of the belt 4.

Referring to FIGS. 9-13, the shaper mechanism 6 is retained by a frame member 80 which projects from the front end of the body 1. The mechanism 6 includes a rod 81 which extends vertically throughout the frame member 80. The rod 81 carries a somewhat oblong base plate 82 rigidly at its lower end. A sleeve 83 is slidably coupled over the rod 81 while a return spring 84 is interposed between the sleeve 83 and the base plate 82. Ears 85 protrude radially outwardly from the lower end of the sleeve 83 into a cruciform shape. Presser members 86 are pivotally connected to the four sides of the base plate 82 by pins 87. The ears 85 and the presser members 86 are interconnected in one to one correspondence by arms or links 88. Rigid on the underside of the base plate 82 is a flexible cup member 89 comprising a shaped block of sponge 91 which is formed with a downwardly open cavity 90. The sponge 91 is covered with a flexible sheet 92 which is in turn covered with a Teflon film 93 inside the cavity 90 only. An arm 94 is securely mounted on the sleeve 83 and movable up and down driven by a motor or the like. The upper end of the rod 81 is in threaded engagement with a stop 95 which is adjustably mounted on the rod 81.

It will be noted that the cup 89 defining the cavity 90 may be constituted by any suitable material other than the sponge 91 covered with the flexible sheet 92. For example, as shown in FIG. 11, the cup 89 may comprise a shaped block of natural or synthetic rubber 91 which is open at the bottom. The synthetic rubber may be typified by silicon rubber. The rubber 91 may be formed with a bore 96 as indicated in FIG. 12, in which air is trapped. If desired, as shown in FIG. 13, the bore 96 may be communicated to the atmosphere through a pressure regulator tube 97 so that air will move into and out of the bore 96 in response to the motions of the flexible cup 89.

When a control switch of the apparatus is turned on, the rollers 2 and 3 are driven to move the conveyor belt 4 as indicated by an arrow and the drive rollers 31 and 32 are driven to move their associated belts 43 and 44 as also indicated by arrows. The rope wheel 28 is rotated by a motor (not shown) and the torque is transmitted to the rope wheel 26 via the rope 27. The rollers 10 and 11 are then caused into rotation to in turn move the conveyor belt 12 forwardly as indicated by an arrow. Simultaneously, the rope wheel 25 is driven by a motor (not shown) and its torque is transferred via the rope 24 to the rope wheels 20 and 20', whereby the rope wheels 21 and 21' rotate in the same direction as the rope wheels 20 and 20' via the rope 23 while the rope wheel 19 rotate in the opposite direction to the rope wheels 21 and 21'. As a result, the loosener bars 17 on the shaft 14 and the smoother bars 18 on the shaft 15 are moved in the same direction as the conveyor belt 12 as indicated by arrows; the scraper bars 16, on the other hand, are moved in the opposite direction to the conveyor belt 12 together with the shaft 13. A material a of an intended product such as rice is introduced into the apparatus through the hopper 8. Then, the material a is loaded on the rear end of the conveyor belt 12 and entrained thereby progressively to the front in accordance with the movement of the belt 12. The material a is first agitated and loosened by the loosener bars 17 which are rotating against the movement of the material a, then levelled to a certain thickness and density by the smoother bars 18 whose direction of movement is the same as the loosener bars 17, and finally scraped out smoothly from the front end of the conveyor belt 12 by the scraper bars 16 which are moving in the same direction as the material a. The material a now drops into the path between the plates 29 and 30 by gravity to progressively accumulate itself between the opposite belts 43 and 44. The resulting heap of material is moved downwardly along the direction of movement of the belts 43 and 44. Due to the decreasing distances of the successive roller pairs from 33, 34 to 39, 40, the material a becomes compressed before it reaches the lowermost guide roller pair 41, 42. Thereafter, at a predetermined timing, the pinion 69 is rotated to move the racks 67 and 68 in laterally opposite directions so that the actuator arms 63 and 64 are moved in the same directions to open the shutters 65 and 66. This causes the compressed material a to drop from between the lowermost guide rollers 41 and 42 toward the belt 4. At the next predetermined timing, the shutters 65 and 66 are closed again to cut a predetermined length of the material from the heap.

Figure 7A:
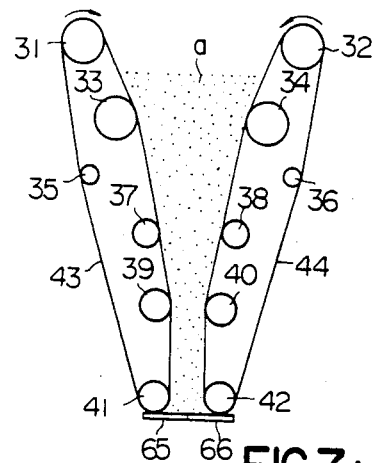
Figure 7B:
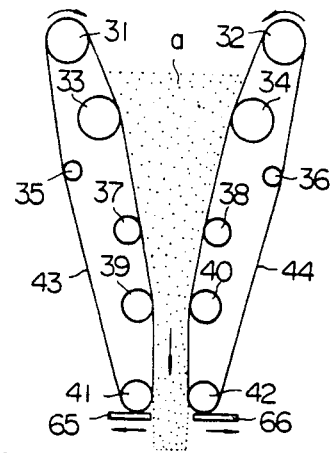
Figure 7C:
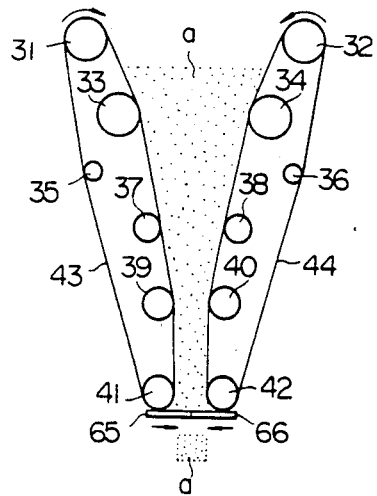

FIGS. 7a–7c illustrate the above procedure in detail. While the drive rollers 31 and 32 rotate with the shutters 65 and 66 closed as shown in FIG. 7a, the opposite belts 43 and 44 are moved to force the material a downwardly thereby compressing it with a suitable pressure. As the shutters 65 and 66 are opened as indicated in FIG. 7b, the compressed material a is moved downwardly by the moving belts 43 and 44. After a predetermined amount or length of material a has been forced out through the shutter gap, the shutters 65 and 66 are closed again to cut it from the rest while preventing from the rest from dropping onto the belt 4. These steps of operation shown in FIGS. 7a–7c will be repeated thereafter.

The adjust rollers 33 and 34 are adjustable to accommodate any change in the hardness of the material a. For example, when the knob 57 is rotated as shown in FIG. 4 to rotate the adjusting rod 53, the sliders 51 and 52 individually threaded on the rod 53 are allowed to slide toward or away from each other along the parallel guide rods 49 and 50. Accordingly, the adjust rollers 33 and 34 secured to the respective sliders 51 and 52 by the shafts 45 and 46 are shifted toward or away from each other until a desired spacing is set up between the opposite belts 43 and 44. This permits the degree of compression of the material a to be varied and, thus, maintains the amount of material a forced out of the mechanism 5 constant regardless of a change in the hardness of the material.

While a cut length of compressed material a is produced as described above, the rocker arm 77 is moved upwardly by a motor (not shown) so that its associated shaft 72 is rotated in the same direction as the movement of the conveyor belt 4. The shaft 72 in turn moves the belt pusher 78 in the same direction until the shoe 78b is brought into contact with the underside of the upper run of the conveyor belt 4, thereby urging the conveyor belt 4 to a parallel upward position. The cut length of material a is thus freed from an impact due to a drop and can be laid in a predetermined position on the belt 4 without being decomposed or tilted.

The block of material a now carried on the conveyor belt 4 is shifted toward the shaper mechanism 6. As soon as the block a reaches a position beneath the mechanism 6, the arm 94 is lowered to move the rod 81, sleeve 83 and the others downwardly toward the conveyor belt 4. Meanwhile, the other belt pusher 79 is moved in the same direction as the belt pusher 78 due to the drive connection constituted by the sprockets 74 and 75 and the chain 76. The shoe 79b of the belt pusher 79 raises the upper run of the conveyor belt 4 just beneath the shaper mechanism 6. As the top of the conveyor belt 4 engages with the bottom of the flexible cup 91, the block of material a becomes fully received in the cavity 90 of the cup 91. The stop 95 on the rod 81 is so positioned as to abut against the frame member 80 when the block a has been fully received in the cavity 90. The stop 95 then prevents any further movement of the rod 81 while the sleeve 83 is further urged downward by the arm 94 against the action of the return spring 84. The sleeve 83 moves the presser members 86 about the corresponding pins 87 through the links 88 until the presser members 86 pressingly engage with the outer surfaces of the flexible cup 89. The sponge 91 of the flexible cup 89 shapes the block of material a very softly as if hand-rolled, that is, mainly pressing the outside of the material only and under even pressure distribution throughout the block. Incidentally, it is generally understood to be a knack in hand-shaping sushi or the like to press only the outside of a block of rice while preventing the pressure from propagating to the inside.

Where use is made of the shaped member 91 shown in FIG. 13, air will be discharged from the bore 96 through the tube 97 during compression and sucked thereinto during non-compression so that the material a can be embraced far more softly by the member 91.

After a predetermined period of time, the arm 94 is raised, the stop 95 is moved clear of the frame member 80, and the return spring 84 is expanded. Then, the presser members 86 are caused to swing outwardly to release the material a from the cavity 90 of the flexible cup 89. The rocker arm 77 is rotated in the opposite direction to move the belt pushers 78 and 79 in the other direction, thereby lowering the conveyor belt 4 to the original level. The belt 4 is indexed to convey the shaped material a away from the shaper mechanism 6. Thereafter, the operation discussed hereabove will be repeated to prepare a desired number of such blocks a.

It will be seen from the foregoing that the present invention attains various advantages quite new to the art. The material for a desired food can be fed to a shaping mechanism after loosening and then progressively compressing it to a condition ready to be processed to a specific shape. Whatever the hardness of the material may be, the material can be transferred to the shaping mechanism a predetermined amount at a time. A block of the material is least liable to break or tilt on a conveyor belt. The material can be processed to a shape and taste comparable with those which hand-shaping would afford. Blocks of the material will always be the same in size and hardness. Apart from such advantages, the foodstuffs prepared by the present invention will be desirable in the hygienic sense and in the aspect of mass-production.

Various modifications will become possible for those skilled in the art after receiving the teachings of the present disclosure without departing from the scope thereof.

What is claimed is:

1. A food shaping apparatus for shaping a foodstuff comprising, in combination:
    feeding means for feeding the foodstuff downward, the feeding means comprising a pair of substantially vertically extending feed belts which are moved in opposite directions to each other, said foodstuff being moved downward into a path defined between said feed belts while being progressively compressed between the feed belts, said path between the feed belts being progressively reduced in width;
    cutter means for cutting a predetermined amount or length of the foodstuff, the cutter means comprising shutters which are moved toward and away from each other in the lateral direction;
    a flexible cup member formed of resilient material and provided with a cavity which is open at one end thereof for receiving the cut length of the foodstuff therein; and
    presser means located outside the flexible cup member for pressing the cut length of the foodstuff through the flexible cup member to shape the foodstuff.

2. An apparatus as claimed in claim 1, in which the flexible cup member is formed with a hollow portion thereinside.

3. An apparatus as claimed in claim 2, in which the flexible cup member comprises a pressure regulator tube which is communicated with the hollow portion.

4. An apparatus as claimed in claim 1, in which the outer periphery of the flexible cup member is covered with a flexible sheet.

5. An apparatus as claimed in claim 1, further comprising second feeding means comprising a horizontal conveyor belt for feeding the cut length of the foodstuff intermittently from said cutter means to said flexible cup member.

6. An apparatus as claimed in claim 1 further comprising hopper means into which the foodstuff is introduced prior to passing to said feeding means.

7. An apparatus as claimed in claim 6 furthe comprising loosener means in said hopper means for loosening the foodstuff, the loosener means comprising loosener bars.

8. An apparatus as claimed in claim 7 further comprising scraping means for scraping the loosened foodstuff from the hopper means, the scraping means comprising scraper bars.

9. A food shaping apparatus for shaping foodstuff comprising feeding and compressing means for feeding said foodstuff downwardly while simultaneously compressing the foodstuff, cutter means underlying said feeding and compressing means for cutting of a predetermined amount of said foodstuff, conveying means for conveying said cut-off foodstuff between a first and second position, said first position underlying said cutter means, a flexible cup means overlying said second position, said flexible cup means having a flexible cup member formed of resilient material and having a generally open cavity for receiving said cut-off foodstuff, and presser means disposed externally of said flexible cup member for pressing the cut-off foodstuff through the cavity of said flexible cup member to thereby shape said cut-off foodstuff.

10. An apparatus as claimed in claim 9, wherein said conveyor means comprises a conveyor belt having an upper run and a lower run, said cut-off foodstuff being conveyed on said upper run, and a belt pusher underlying said upper run, said belt pusher engaging said upper run at a location underlying said cut-off foodstuff to thereby press said cut-off foodstuff into said cavity of said flexible cup means.

11. An apparatus as claimed in claim 10, wherein said upper run traverses a generally horizontal path between said first and second positions, and further comprising a second belt pusher underlying said upper run at said first position, said second pusher engaging said upper run to raise the overlying upper run to a position higher than said horizontal path to receive said foodstuff as it is being cut and then to lower said cut-off foodstuff to the level of said horizontal path where said cut-off foodstuff is then conveyed to said second position along said horizontal path.

12. A food shaping apparatus for shaping foodstuff comprising feeding means for feeding said foodstuff downwardly, cutter means underlying said feeding means for cutting of a predetermined amount of said foodstuff, conveying means for conveying said cut-off foodstuff between a first and second position, said first position underlying said cutter means, a flexible cup means overlying said second position, said flexible cup means comprising a flexible cup member formed of resilient material and having a generally open cavity for receiving said cut-off foodstuff, and a belt pusher means underlying said second position and operable to raise the portion of said conveyor means on which said cut-off foodstuff is disposed to thereby raise and press said cut-off foodstuff into said cavity.

13. An apparatus as claimed in claim 1 in which the presser means comprises a base member and a plurality of presser members pivotably mounted on said base member for pivotal movement between a pressed position and an open position, said flexible cup member being formed with a generally inverted cup-shaped configuration having a top wall and a downwardly depending side wall, said presser members engaging the outside of said downwardly depending side wall to flexibly move said side wall generally inwardly when said presser members are in said pressed position and to permit said side wall to move generally outwardly when said presser members are in said open position.

14. An apparatus as claimed in claim 13 wherein said base member has a bottom wall, said top wall of said flexible cup member being rigidly secured to said bottom wall of said base member.

15. An apparatus as claimed in claim 14 wherein said presser means further comprises actuating means for pivoting said presser members, said actuating means comprising a rod extending upwardly from said base member, a sleeve slidable on said rod, and link means operably connected between said sleeve and said presser members such that sliding movement of said sleeve or said rod effects a pivotal movement of said presser members between said pressed and open positions.

16. An apparatus as claimed in claim 15 wherein said actuating means further comprises biasing means disposed about said rod for biasing said sleeve in a direction such that said presser arms are biased in said open position, and an arm extending from said sleeve for moving said sleeve in a direction to overcome the bias of said biasing means and to pivot said presser members to said pressed position.

* * * * *